(12) United States Patent
Haas et al.

(10) Patent No.: US 8,180,478 B2
(45) Date of Patent: May 15, 2012

(54) METHOD FOR ACTIVATING A WORKPIECE MANIPULATOR OF A MACHINE TOOL

(75) Inventors: Roland Haas, St. Georgen/Gusen (AT); Klaus Dirnberger, Enns (AT)

(73) Assignee: Anger Machining GmbH, Traun (AT)

( * ) Notice: Subject to any disclaimer, the term of this patent is extended or adjusted under 35 U.S.C. 154(b) by 0 days.

(21) Appl. No.: 12/737,324

(22) PCT Filed: Aug. 7, 2009

(86) PCT No.: PCT/AT2009/000304
§ 371 (c)(1),
(2), (4) Date: Dec. 31, 2010

(87) PCT Pub. No.: WO2010/017569
PCT Pub. Date: Feb. 18, 2010

(65) Prior Publication Data
US 2011/0098843 A1    Apr. 28, 2011

(30) Foreign Application Priority Data

Aug. 14, 2008    (AT) ................. A 1271/2008

(51) Int. Cl.
*G06F 19/00*    (2011.01)
(52) U.S. Cl. .................... 700/169; 700/159; 700/186
(58) Field of Classification Search ................ 700/159, 700/169, 179, 184, 186
See application file for complete search history.

(56) References Cited

U.S. PATENT DOCUMENTS

| | | | |
|---|---|---|---|
| 5,189,624 A * | 2/1993 | Barlow et al. ................. | 700/169 |
| 5,197,172 A * | 3/1993 | Takagi et al. ................. | 700/169 |
| 5,825,655 A | 10/1998 | Nakagawa et al. | |
| 6,257,108 B1 * | 7/2001 | Otake ............................ | 82/1.11 |
| 6,445,971 B1 * | 9/2002 | Gottschalk et al. ........... | 700/159 |
| 6,668,208 B2 * | 12/2003 | Baumbusch et al. .......... | 700/169 |
| 7,065,856 B1 * | 6/2006 | Lemelson ....................... | 700/169 |

(Continued)

FOREIGN PATENT DOCUMENTS

DE    695 04 998    4/1999

(Continued)

OTHER PUBLICATIONS

International Search Report.

*Primary Examiner* — Charles Kasenge
(74) *Attorney, Agent, or Firm* — Collard & Roe, P.C.

(57) ABSTRACT

The invention relates to a method for activating a workpiece manipulator (4) of a machine tool (1), comprising a control device which prescribes machining paths (6) for a workpiece by means of a computing unit, which machining paths are travelled by the workpiece manipulator (4) from a machine starting position (A), wherein the workpiece (5) which can be moved by the workpiece manipulator (4) in a multi-axially translatory and preferably also rotating manner is passed to a plurality of tools (3) one after the other for the step-by-step machining. In order to provide advantageous conditions it is proposed that in the case of termination of machining the workpiece manipulator (4) is made to move with the workpiece (5) back over the path of movement (7) assigned to the respective machining step into a position (8) prior to this machining step, in which the workpiece manipulator is optionally stopped or from which the workpiece manipulator is moved into the machine starting position (A).

5 Claims, 2 Drawing Sheets

U.S. PATENT DOCUMENTS

| | | | |
|---|---|---|---|
| 7,367,929 B2 * | 5/2008 | Feinauer et al. | 483/15 |
| 2002/0107606 A1 * | 8/2002 | Baumbusch et al. | 700/169 |
| 2008/0082201 A1 * | 4/2008 | Wakazono | 700/169 |

FOREIGN PATENT DOCUMENTS

| | | |
|---|---|---|
| EP | 0 373 222 | 6/1990 |
| EP | 1 618 987 | 1/2006 |
| JP | 4-193416 | 7/1992 |
| JP | 09-091018 | 4/1997 |
| JP | 9-117827 | 5/1997 |
| WO | WO 97/10932 | 3/1997 |
| WO | WO 2008/089751 | 7/2008 |

* cited by examiner

METHOD FOR ACTIVATING A WORKPIECE MANIPULATOR OF A MACHINE TOOL

CROSS REFERENCE TO RELATED APPLICATIONS

This application is the National Stage of PCT/AT2009/000304 filed on Aug. 7, 2009, which claims priority under 35 U.S.C. §119 of Austrian Application No. A 1271/2008 filed on Aug. 14, 2008, the disclosure of which is incorporated by reference. The international application under PCT article 21(2) was not published in English.

1. Field Of The Invention

The invention relates to a method for activating a workpiece manipulator of a machine tool, comprising a control device which prescribes machining paths for a workpiece by means of a computing unit, which machining paths are travelled by the workpiece manipulator from a machine starting position, wherein the workpiece which can be moved by the workpiece manipulator in a multi-axially translatory and preferably also rotating manner is passed to a plurality of tools one after the other for the step-by-step machining.

2. Description Of The Prior Art

With known machining tools (WO 97/10932 A), the workpiece to be machined is fixed to the workpiece holder of the workpiece carrier and is moved with the workpiece carrier to successive individual machining and measuring tools such as drills, milling cutters, grinders or the like. The machining tools are arranged on spindles fastened in a stationary manner on the frame of the rack, with the spindles being displaceable in an alternating manner between an extended working position and a retracted idle position in order to prevent mutual obstructions of the spindles during the machining by spindles that are in the idle position at that time. These known machine tools are especially characterized by their economical operation, which is achieved especially in such a way that it is not necessary to wait for any tool changing times and idle times during a machining process because the machine tool accommodates the required tools in the different spindles and the tools thus need not be changed between the individual machining processes and can be started up already before the positioning of the workpiece from one spindle to the next. As a result of these measures, non-productive times are minimized and rapid machining of the. workpieces is enabled. Moreover, multi-spindle parallel machining of several workpieces is possible in such apparatuses.

The workpiece is usually movable in a translatory manner in three axes with the workpiece carrier on a carriage, and is further rotatable about at least one rotational axis, in order to guide the workpiece in the desired manner with respect to the individual fixed machining tools and to also enable the milling, drilling or grinding of complex paths.

It is a special disadvantage of these known machine tools that the workpiece manipulator plus workpiece usually need to be moved back manually to the starting position of the machine in the event of a termination of the machining during the machining process, e.g. by an emergency stop, breakage of a tool or the like, in order to prevent further damage to the tool or the workpiece and especially to adjacent tools arranged in the machine tool. If the workpiece is displaced in an automated manner after the termination of the machining along the shortest path from the current machining position to the starting position of the machine, further damage can occur to the workpiece and especially to the surrounding tools, leading to expensive non-productive times and follow-up work.

SUMMARY OF THE INVENTION

Based on a technique of the kind mentioned initially, the invention is based on the object of providing a method for activating a workpiece manipulator of a machine tools which on the one hand enables the machining of a workpiece with an increased number of tools under the shortest possible machining times, i.e. minimized non-productive periods, and on the other hand allows a rapid and secure return of the workpiece manipulator with the workpiece to the starting position of the machine in the event of a termination of machining.

This object is achieved by the invention in such a way that the workpiece manipulator is made to move with the workpiece back over the path of movement assigned to the respective machining step into the starting position which was prior to this machining step and was vacated by the tool, in which the workpiece manipulator is optionally stopped or from which the workpiece manipulator is moved into the machine starting position.

An automatic return of the workpiece manipulator plus workpiece to the machine starting position is thus easily possible with these measures in accordance with the invention, without damaging tools associated with other machining steps and without damaging the tool spindles associated with these machining steps. Machining is principally subdivided into several machining steps, with one machining step being associated with one machining tool in the simplest of cases. The starting position in the respective machining tool can be accessed especially in a direct and secure manner from the machine starting position or from the end position of a preceding machining step in another tool without having to fear any damage to the workpiece or tools and tool spindles. Based on these starting positions, the machining is started on the respective tool and in the case of a termination of machining as a result of emergency stop or tool breakage or the like the workpiece manipulator plus workpiece are moved back along the path of movement to the starting position associated to this machining step, from which the workpiece manipulator plus workpiece can optionally be displaced without any problems in an automated manner to the machine starting position. It is understood that also the entire path of movement in all tools up to the machine starting position can be travelled back.

With these simple measures it is possible to realize an automated free passage of tools in the event of machining termination also on already existing machine tools by implementing a respective control. The free passage can be realized in an especially simple and cost-effective manner with the measures in accordance with the invention for machine tools that are newly designed. Since the workpieces produced with these machine tools usually concern pieces of medium or larger series, workpiece rejects which are optionally produced by the return travel can usually be accepted without any problems. This does not apply however to additionally increased non-productive times of the machine which are produced by collisions of the workpiece with intact tools or machining spindles and which optionally lead to a change of the same.

As already mentioned, it is recommended for reasons of simplicity that each machining process in a tool corresponds to one machining step. Complex machining on different surfaces of workpieces may also necessitate that each surface to be machined is associated with a separate starting and intermediate position, so that optionally only the machining step on the respective surface needs to be returned to the starting or intermediate position and it is not necessary to move to the starting position in each tool.

In the event that there are simple control devices, it is recommended for implementing the invention on a machine tool that the path of movement of each machining step is logged from the machine starting position, especially from the respective starting position or between end position in one tool to starting position of the next tool, and the workpiece manipulator plus workpiece are moved back along the logged path of movement in the case of a termination of machining up to the starting position, preferably the one associated with this machining step.

As an alternative to this, the processor can calculate the inverse of the path of movement leading to the starting position associated with this machining step starting from the position of the machining termination and move back the workpiece manipulator plus workpiece by the control device along the calculated inverse path of movement up to the starting position preferably associated with this machining step. When the machining is defined by the control device by points to be accessed, the points merely need to be passed in the reverse sequence. In the event that the control device predetermines the machining by vectors, the vectors need to be inverted and passed in the reverse direction to the starting position.

In order to further minimize the damage probability of tools or tool spindles it is recommended that the workpiece with the tool manipulator is moved successively to a plurality of fixed tool spindles positioned in a frame-like rack at different positions, with the tool spindles being movable from a retracted idle position to an extended working position for machining the workpiece.

It is further recommended that the return parameters for the return travel on the path of movement is chosen by the control device depending on the tool associated with the machining step and the return travel occurs at reduced speed. It would principally be advantageous to displace the workpiece with the tool manipulator over the shortest possible collision-free return path to the machine starting position. This gives rise to the problem however that complex collision calculations and respective programmes would be necessary which the invention wishes to avoid however to the highest possible extent.

BRIEF DESCRIPTION OF THE DRAWINGS

The invention is schematically shown in the drawings by reference to an embodiment, wherein.

DESCRIPTION OF THE PREFERRED EMBODIMENT

Figure 1:
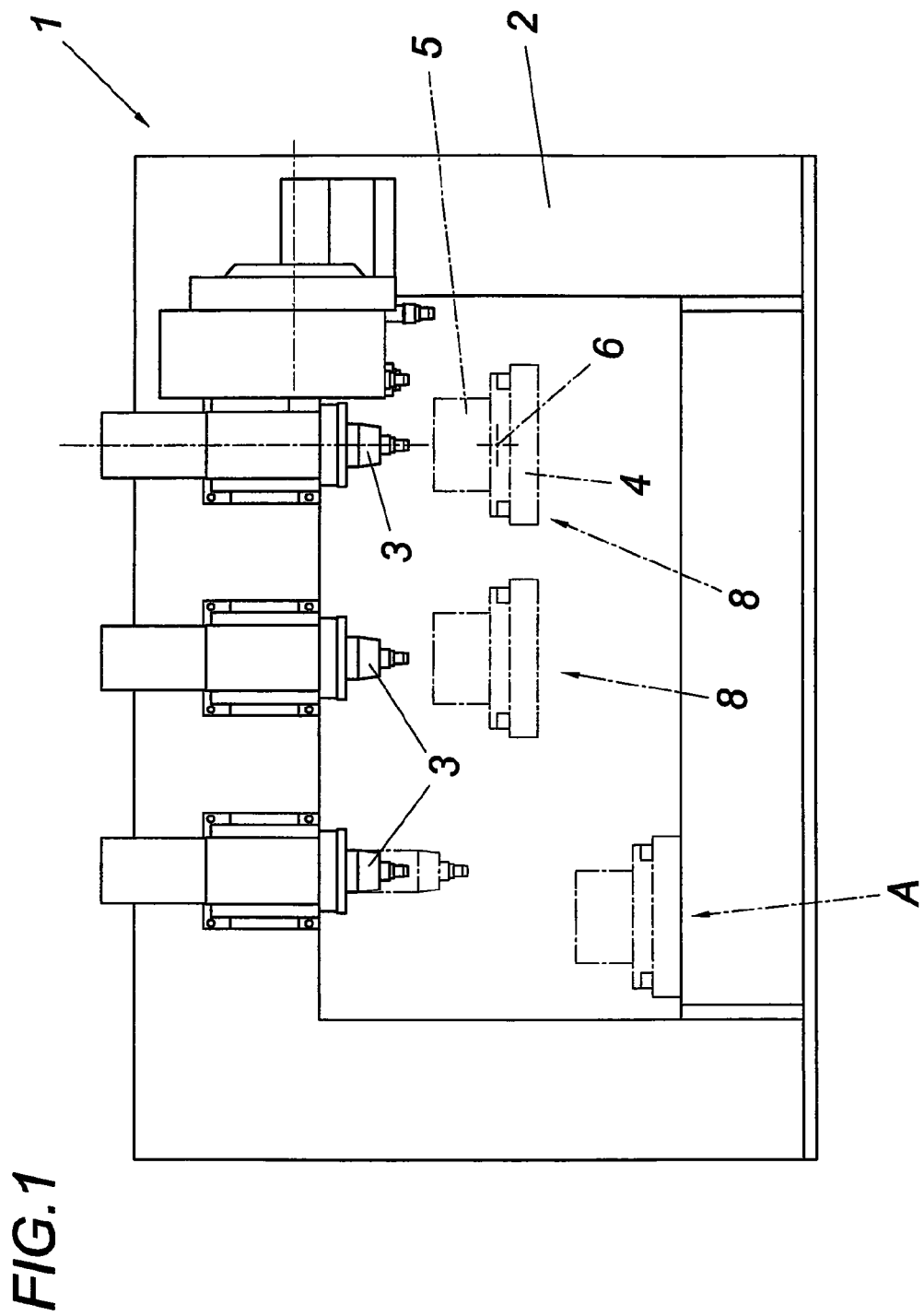
FIG. 1 shows a front view of a machine tool for performing the method in accordance with the invention.

A machine tool 1 for performing the method in accordance with the invention comprises a plurality of tool spindles 3 which are arranged in a fixed manner on a rack 2 and can be positioned in different positions. It is indicated in FIG. 1 with the dot-dash line that the individual tool spindles can be movable between a retracted idle position and an extended working position in order to prevent obstructions in the machining of workpieces by other tools.

Furthermore, the machine tool 1 comprises a workpiece manipulator 4 which accommodates a workpiece 5 to be machined. Said workpiece manipulator 4 can be moved in the illustrated embodiment in a translatory manner in three axes, i.e. on the one hand in the plane of frame of rack 2 and perpendicular to said plane of the frame and on the other hand rotatably about an axis 6. It is additionally known from the state of the art to dispose the workpiece itself in a rotatably driven way on the workpiece manipulator 4.

The implementation of the method in accordance with the invention for activating a workpiece manipulator 4 of a machine tool 1 occurs by means of a control device which is not shown in closer detail and which via a computer unit (not shown in closer detail) predetermines movement paths 6 for a workpiece to be travelled with the workpiece manipulator 4 from a machine starting position A, with the workpiece 5 which can be moved by the workpiece manipulator 4 in a translatory multi-axial manner and preferably also rotatable manner being successively moved to a plurality of tools 3, and with each machining step in a workpiece being associated with a starting position 8 of the workpiece manipulator 4.

In the event of the termination of machining as a result of an emergency stop or tool damage, the workpiece manipulator 4 with the workpiece 5 is moved back along the path of movement 7 preceding the respective machining step to the starting position 8 associated with said machining step, whereupon the workpiece manipulator is optionally stopped or moved to the machine starting position A.

Figure 2:
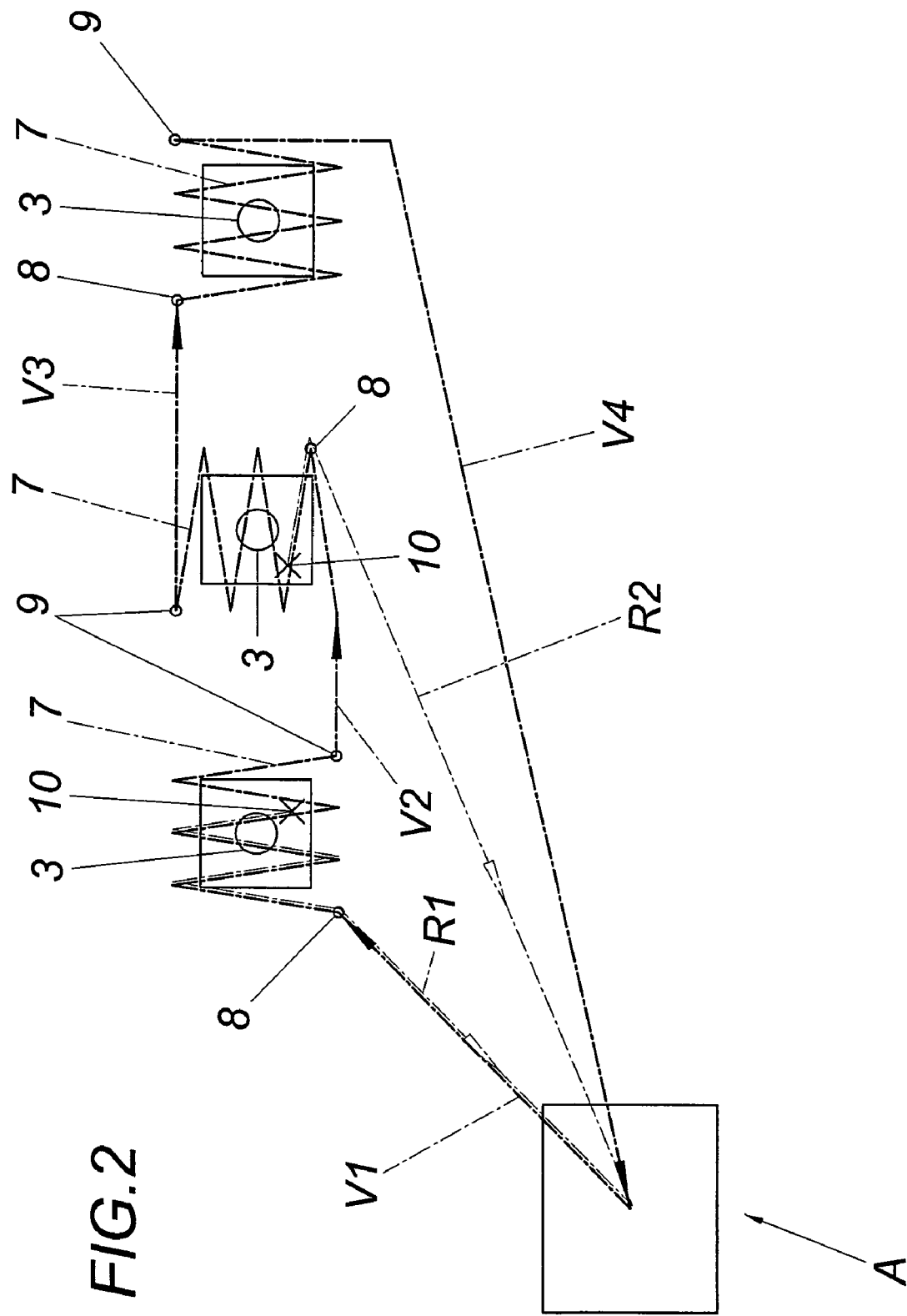
FIG. 2 shows a diagram of the paths of movement for the machining of a workpiece performed on an apparatus according to FIG. 1.

An exemplary diagram of a movement path is shown in FIG. 2. Based on the starting position A, the workpiece 5 is moved by the workpiece manipulator 4 along the vector V1 to the starting position 8 of the first tool. The machining is then started on this tool and the workpiece 5 moves along the predetermined path of movement 7 with the control device. After the machining, the end point 9 of this machining path is reached and the workpiece 5 is moved by the workpiece manipulator 4 along the vector V2 to the second tool and, after machining on this tool, is moved along the vector V3 to the third tool. After the completion of the machining, the workpiece 5 is moved along the vector V4 to the machine starting position.

If a termination 10 of the machining occurs during machining on the first tool, the workpiece 5 is moved by the workpiece manipulator 4 along the preceding path of movement up to the starting position 8 on this tool and subsequently to the machine starting position A. This is indicated in the embodiment of FIG. 2 by the dot-dash line R1. The return movement occurs along the dot-dash line R2 in the case of a termination of machining on the second workpiece.

The invention claimed is:

1. A method for activating a workpiece manipulator of a machine tool, comprising a control device, the control device prescribing machining paths for a workpiece via a processor,
   wherein the workpiece manipulator travels the machining paths from a machine starting position,
   wherein the workpiece can be moved by the workpiece manipulator in a multi-axially translatory manner and is passed to a plurality of tools one after another for step-by-step machining,
   wherein, in a case of termination of machining, the workpiece manipulator is made to move with the workpiece back over a path of movement assigned to a respective machining step into a prior position, the prior position being prior to the respective machining step, and is vacated by the tool,
   wherein in the prior position the workpiece manipulator is stopped or the workpiece manipulator is moved from the prior position into the machine starting position,
   wherein a path of movement of each machining step is logged from the machine starting position, especially from a respective starting position or between an end position in one tool to a starting position of a next-in-line tool, and wherein, in the case of the termination of machining, the workpiece manipulator is moved with the workpiece back along a logged path of movement up to the machine starting position.

2. The method according to claim 1, wherein each machining process in the machine tool corresponds to a machining step.

3. The method according to claim 1, wherein the workpiece is moved by the workpiece manipulator successively to a plurality of fixed tool spindles positioned in a frame-like rack at different positions, and wherein the fixed tool spindles are movable from a retracted idle position to an extended working position for machining the workpiece.

4. The method according to claim 1, wherein return parameters for return travel of the path of movement are chosen by the control device depending on a respective tool associated with the respective machining step.

5. A method for activating a workpiece manipulator of a machine tool, comprising a control device, the control device prescribing machining paths for a workpiece via a processor, wherein the workpiece manipulator travels the machining paths from a machine starting position, wherein the workpiece can be moved by the workpiece manipulator in a multi-axially translatory manner and is passed to a plurality of tools one after another for step-by-step machining, wherein, in a case of termination of machining, the workpiece manipulator is made to move with the workpiece back over a path of movement assigned to a respective machining step into a prior position, the prior position being prior to the respective machining step, and is vacated by the tool, wherein in the prior position the workpiece manipulator is stopped or the workpiece manipulator is moved from the prior position into the machine starting position, wherein starting from a position of the termination of machining the processor can calculate an inverse path of the path of movement leading to a starting or intermediate position associated with the respective machining step, and wherein the workpiece manipulator is then moved with the workpiece back along the calculated inverse path up to the starting or intermediate position associated with the respective machining step.

* * * * *